United States Patent
Hossain et al.

(10) Patent No.: US 11,709,365 B1
(45) Date of Patent: Jul. 25, 2023

(54) MOTOR TEMPERATURE SENSOR FOR HEAD-MOUNTABLE DEVICE

(71) Applicant: Apple Inc., Cupertino, CA (US)

(72) Inventors: Muhammad F. Hossain, San Jose, CA (US); Jia Tao, Santa Clara, CA (US); Vijayanish Varadharajan, Milpitas, CA (US); Alexander M. Brukwinski, San Jose, CA (US); Pyone P. Wynn, Santa Clara, CA (US); Hnin Ookhin, Cupertino, CA (US); Samuel A. Resnick, Cupertino, CA (US); Aviran Malik, San Francisco, CA (US); Jason C. Sauers, Sunnyvale, CA (US); Amarnath Vuppala, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 166 days.

(21) Appl. No.: 17/228,592

(22) Filed: Apr. 12, 2021

Related U.S. Application Data

(60) Provisional application No. 63/023,761, filed on May 12, 2020.

(51) Int. Cl.
*G02B 27/01* (2006.01)
*H02P 29/66* (2016.01)

(52) U.S. Cl.
CPC ........ *G02B 27/0176* (2013.01); *H02P 29/664* (2016.11); *G02B 2027/0138* (2013.01); *G02B 2027/0192* (2013.01)

(58) Field of Classification Search
CPC ........ G02B 27/0176; G02B 2027/0138; G02B 2027/0192; H02P 29/664
See application file for complete search history.

(56) References Cited

U.S. PATENT DOCUMENTS

| | | | |
|---|---|---|---|
| 9,202,443 B2 | 12/2015 | Perez et al. | |
| 9,323,325 B2* | 4/2016 | Perez | G06F 3/017 |
| 9,395,543 B2 | 7/2016 | Lamb et al. | |
| 9,717,949 B1 | 8/2017 | Tran et al. | |
| 10,701,350 B1* | 6/2020 | Ebert | A61B 3/0075 |
| 2004/0049319 A1* | 3/2004 | Kanki | G05B 23/0272 |
| | | | 700/275 |
| 2015/0305629 A1* | 10/2015 | Fritz | A61B 5/684 |
| | | | 600/549 |
| 2017/0237977 A1* | 8/2017 | Patel | G02B 27/0176 |
| | | | 348/53 |
| 2017/0324309 A1* | 11/2017 | Huang | H02K 5/203 |
| 2018/0267304 A1* | 9/2018 | Sasaki | B60K 35/00 |
| 2021/0037232 A1* | 2/2021 | Lin | H04N 13/239 |

* cited by examiner

*Primary Examiner* — Kwang-Su Yang
(74) *Attorney, Agent, or Firm* — BakerHostetler

(57) ABSTRACT

A head-mountable device can effectively manage heat with a motor assembly that efficiently and accurately senses a temperature of a motor. A temperature sensor can be provided on an outer surface (e.g., case) of the motor. A flex circuit can be operably connect both the motor and the temperature sensor to a controller of the head-mountable device. The flex circuit can have a first side coupled to the outer surface of the case, a second side supporting the temperature sensor, and thermally conductive vias extending from the first side to the second side to conduct heat from the case to the sensor. The flex circuit can further include a memory comprising calibration data of the temperature sensor and a connector for outputting temperature data based on the temperature sensor and the calibration data of the memory.

17 Claims, 3 Drawing Sheets

MOTOR TEMPERATURE SENSOR FOR HEAD-MOUNTABLE DEVICE

CROSS-REFERENCE TO RELATED APPLICATION

This application claims the benefit of U.S. Provisional Application No. 63/023,761, entitled "MOTOR TEMPERATURE SENSING FOR HEAD-MOUNTABLE DEVICE," filed May 12, 2020, the entirety of which is incorporated herein by reference.

TECHNICAL FIELD

The present description relates generally to motor temperature sensing, and, more particularly, to sensing temperature of a motor of a head-mountable device.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
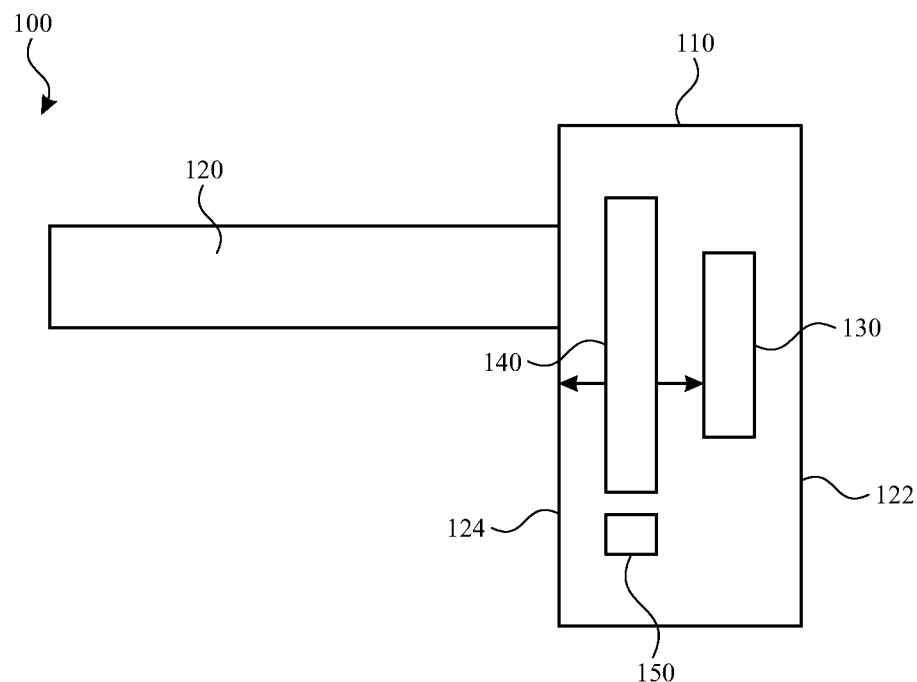
FIG. 1 illustrates a side view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mounted displays, headsets, visors, smartglasses, head-up display, etc., can perform a range of functions that are managed by the components (e.g., sensors, circuitry, and other hardware) included with the wearable device. The head-mountable device can provide a user's experience that is immersive or otherwise natural so the user can easily focus on enjoying the experience without being distracted by the mechanisms of the head-mountable device.

Components of a head-mountable device can generate heat during operation. For examples, motors can be operated to move components of the head-mountable device as needed to enhance a user's experience. However, motors and other components can generate heat, which can damage the components of the head-mountable device and cause discomfort to the user. It can be desirable to sense, detect, track, and predict the heat output (e.g., temperature) of such components so their operation can be managed and/or mitigation steps can be performed.

Systems of the present disclosure can provide a head-mountable device that effectively manages heat with a motor assembly that efficiently and accurately senses a temperature of a motor. The motor can be operated, for example, to move display modules relative to a frame and/or each other. Within the motor case, coils can drive a rotor. A temperature sensor can be provided on an outer surface (e.g., case) of the motor. A flex circuit can be operably connect connecting both the motor and the temperature sensor to a controller of the head-mountable device. The flex circuit can have a first side coupled to the outer surface of the case, a second side supporting the temperature sensor, and thermally conductive vias extending from the first side to the second side to conduct heat from the case to the sensor. The flex circuit can further include a memory comprising calibration data of the temperature sensor and a connector for outputting temperature data based on the temperature sensor and the calibration data of the memory.

A motor assembly such as those described herein can provide built-in temperature monitoring of the motor. Accordingly, the assembly can be compact and lightweight with minimal addition of mechanisms to operably connect the components to each other. Additionally, by storing calibration data on a memory of the flex circuit, the resulting output can readily provide temperature data that is already converted to a desired output type.

These and other embodiments are discussed below with reference to FIGS. 1-6. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the securement element 120 of the head-mountable device 100.

The frame 110 can include and/or support one or more camera modules 130. The camera modules 130 can be positioned on or near an outer side 122 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the camera modules 130 can be movable along the outer side 122. For example, a track or other guide can be provided for facilitating movement of the camera module 130 therein.

The head-mountable device 100 can include display modules 140 that provide visual output for viewing by a user wearing the head-mountable device 100. One or more display modules 140 can be positioned on or near an inner side 124 of the frame 110. As used herein, an inner side 124 of a portion of a head-mountable device is a side that faces toward the user and/or away from the external environment.

The head-mountable device 100 can include one or more motors 150 for moving one or more components of the head-mountable device 100. Such components can be moved by a motor 150 relative to the frame 110 or another component. For example, a motor 150 can be operated to move and position a display module 140 to be within the field of view of a user's eye(s) while the frame 110 is secured to a head of the user.

The motor 150 can be operated to move the display module 140 based on target locations, positions, and/or outcome as well as one or more of a variety of measurements. For example, the display module 140 can be moved to a target location based on a desired visual effect that corresponds to user's perception of the display module 140 when it is positioned at the target location. The target location can be determined based on a focal length of the user and/or optical elements of the system. For example, the user's eye and/or optical elements of the system can determine how the visual output of the display module 140 will be perceived by the user. The distance between the display module 140 and the user's eye and/or the distance between the display module 140 and one or more optical elements can be altered to place the display module 140 at, within, or outside of a corresponding focal distance. Such adjustments can be useful to accommodate a particular user's eye, corrective lenses, and/or a desired optical effect. It will be understood that such movement can be controlled by mechanisms described herein for additional purposes.

The position of the display module 140 can be measured directly to provide a feedback for control actions taken with respect to the motor 150. For example, a sensor can be provided to directly measure the proximity and/or position of the display module 140 (e.g., with an encoder) with respect to one or more other structures (e.g., the frame 110). Additionally or alternatively, the position of the display module 140 can be inferred and/or calculated based on other measurements.

Figure 2:
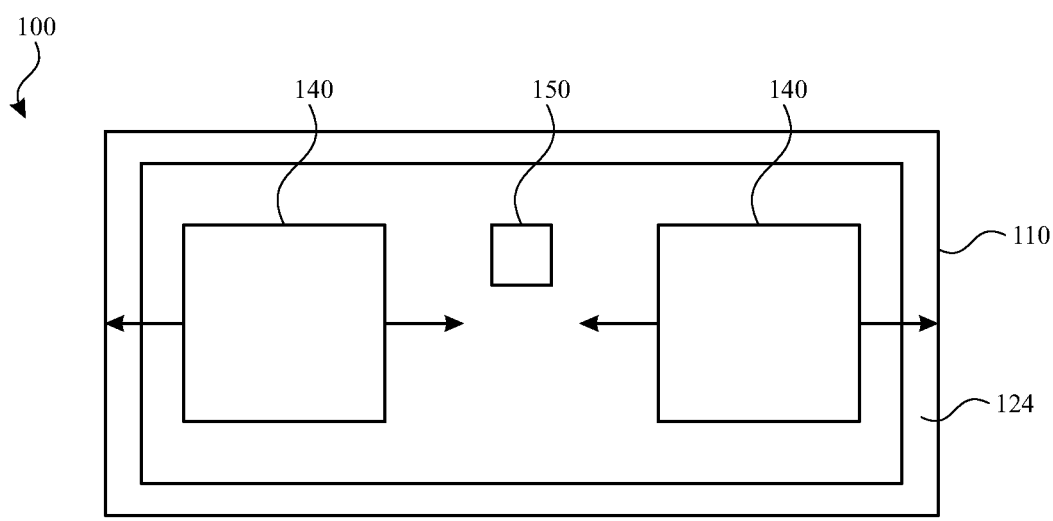
FIG. 2 illustrates a rear view of a head-mountable device, according to some embodiments of the present disclosure.

Referring now to FIG. 2, a motor can provide other adjustments to display modules relative to a frame and/or each other. As shown in FIG. 2, a display module 140 can be provided for each eye of the user on the inner side 124 of the frame 110. Each display module 140 can be adjusted to align with a corresponding eye of the user. For example, each display module 140 can be moved along one or more axes until a center of each display module 140 is aligned with a center of the corresponding eye. Accordingly, the distance between the display modules 140 can be set based on an interpupillary distance of the user. IPD is defined as the distance between the centers of the pupils of a user's eyes.

The pair of display modules 140 can be mounted to the frame 110 and separated by a distance. The distance between the pair of display modules 140 can be designed to correspond to the IPD of a user. The distance can be adjustable to account for different IPDs of different users that may wear the head-mountable device 100. For example, either or both of the display modules 140 may be movably mounted to the frame 110 to permit the display modules 140 to move or translate laterally to make the distance larger or smaller. Any type of manual or automatic mechanism may be used to permit the distance between the display modules 140 to be an adjustable distance. For example, the display modules 140 can be mounted to the frame 110 via slidable tracks or guides that permit manual or electronically actuated movement of one or more of the display modules 140 to adjust the distance there between.

Movement of each of the display modules 140 can match movement of a corresponding camera. For example, each display module 140 can be supported on the inner side 124 of the frame 110, and a camera can be coupled to and movable with a corresponding one of the display modules 140. The display module 140 can be adjusted to align with the corresponding eye of the user, and the camera can be correspondingly adjusted so that the field of view provided by the display module 140 corresponds to a field of view captured by the camera. Accordingly, the display module 140 is able to accurately reproduce, simulate, or augment a view based on a view captured by the camera with an alignment that corresponds to the view that the user would have naturally without the head-mountable device 100.

A display module 140 can transmit light from a physical environment (e.g., as captured by a camera module) for viewing by the user. Such a display module 140 can include optical properties, such as lenses for vision correction based on incoming light from the physical environment. Additionally or alternatively, a display module 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be understood that controls, adjustments, and movements provided by operation of the motor 150 can be applied to an entirety of a display module 140 or a component thereof. For example, the display module 140 can include light emitters, lenses, filters, polarizers, prisms, beam splitters, diffraction gratings, mirrors, and/or windows that can be moved relative to each other and/or other components (e.g., the frame 110).

The motor 150 can be provided with components that facilitate movement. For example, the motor 150 can include or be connected to drivetrain components such as gears, clutches, and/or transmissions, to facilitate independent or simultaneous movement of components based on operation of one or more motors 150. The movements of one or more components can be facilitated by rails, grooves, pathways, and/or other structures that receive, engage, and/or interact with each other to guide, limit, and/or direct movement.

While the motor 150 can move a display module 140, it will be understood that the motor 150 can be operated to move other components. For example, a sensor, an input device, and/or an output device can be moved by a motor 150 to provide a function at and/or to a given location. By further example, a user engagement element, such as a head securement element, can be moved by a motor 150 to engage and/or release a portion of a user.

Figure 3:
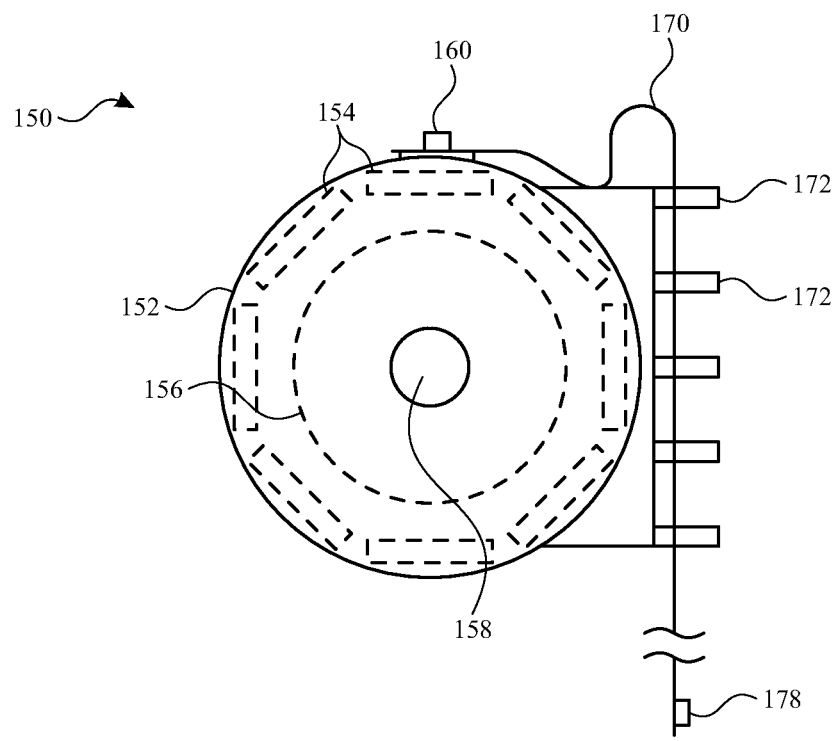
FIG. 3 illustrates a side view of a motor assembly, according to some embodiments of the present disclosure.

Referring now to FIG. 3, a motor assembly can be provided with features that provide motor functionality as well as temperature sensing. As shown in FIG. 3, the assembly can include a motor 150 that is operable to provide rotational or other mechanical movement. At least some of the components of the motor 150 can be contained within a case 152. For example, the motor 150 can include one or more coils 154 arranged at an inner surface of the case 152. The coils 154 can form part or all of a stator portion of the motor 150.

The motor 150 can further include a rotor 156 that is rotatable within and with respect to the case 152. The rotor 156 can include or be connected to an output shaft 158 that extends out the case 152. The output shaft 158 can be connected to a component to be moved, so that rotation of the rotor 156 and/or the output shaft 158 accomplishes the desired movement.

The motor 150 can include one or more other components to facilitate operation thereof. For example, the motor 150 can include one or more magnets, main poles, and/or interpoles at the stator portion and/or the rotor portion. By further example, the motor 150 can include an armature, one or more armature windings, a brush, and/or a commutator at the stator portion and/or the rotor portion. The motor 150 can be a DC motor or an AC motor.

The assembly can include a temperature sensor 160 positioned on an outer surface of the case 152 of the motor 150. The temperature sensor 160 can include one or more of a variety of types of temperature sensors, including thermistors, thermocouples, resistance thermometers, bandgap temperature sensors, thermal capacity sensors, infrared sensors, and the like. The temperature sensor 160 can be configured to detect a temperature of the motor 150 as determined at the outer surface of the case 152, as described further herein.

The assembly can include a flex circuit 170 that operably connects components of the assembly to each other and/or other components. As used herein, "flexible circuit" or "flex circuit" is a structure that includes a conductive layer, an insulation layer, and optionally a substrate layer. A flex circuit can be provided in electrical communication with at least one electrode, terminal, and/or connector. A flex circuit forms circuitry that includes a pattern of conductors of the conductive layer typically in the form of pads, which are typically formed on a surface of an insulating material of the insulation layer. Such circuitry is typically metallic, such as of a copper or copper alloy. In general, a flex circuit is thin, having a total thickness of from about 1 mm to about 30 mm. A flex circuit is generally flexible, such that it can conform to contours of other components. A flex circuit may be any suitable size, and constructed in any suitable shape. For example, the size of a flex circuit may be determined by the power requirements of the components connected thereto (e.g., motor 150), the conductivity of the flex circuit, the distance between operably connected components, or any other suitable criteria.

The flex circuit 170 can operably connect the temperature sensor 160 and the motor 150 to a controller of the head-mountable device. For example, the flex circuit 170 can have, at an end portion thereof, a connector 178 for providing electrical communication through the circuitry of the flex circuit 170.

The flex circuit 170 can operably connect to the motor 150 and the components thereof. For example, the motor 150 can include one or more terminals 172 that connect the flex circuit 170 to the coils 154 of the motor 150. Accordingly, the flex circuit 170 can provide electrical power and/or control signals from a controller to energize the coils 154 and drive the rotor 156 of the motor 150. Any number of terminals 172 can be provided to connect to, for example, a corresponding number of coils 154.

The flex circuit 170 can have an end portion that extends to the temperature sensor 160 on the outer surface of the case 152 of the motor 150. The temperature sensor 160 can be positioned a distance away from the terminals 172, so that heat generated by electrical power and/or control signals for the coils 154 is not applied to the temperature sensor 160. Additionally, the terminal 172 can be connected to the flex circuit 170 at a position between the temperature sensor 160 and the connector 178. It will be understood that the flex circuit 170 can provide a continuous structure that connects the connector 178 to the terminals 172 of the motor 150 and the temperature sensor 160 of the assembly.

It will be understood that other mechanisms can be provided in addition to and/or in place of the flex circuit 170. For example, operable connections can be made with any conductive circuit, wires, leads, and/or connectors between components.

Figure 4:
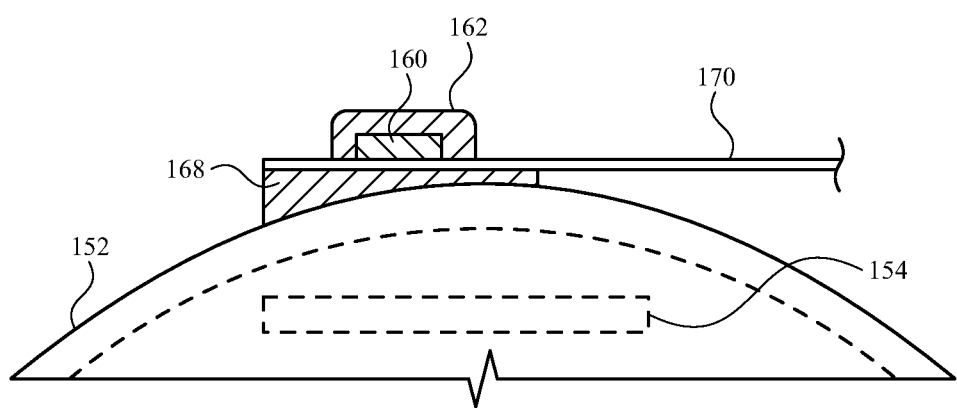
FIG. 4 illustrates an enlarged side view of a portion of the motor assembly of FIG. 3, according to some embodiments of the present disclosure.

Referring now to FIG. 4, the temperature sensor can be positioned in close thermal contact with the motor. As shown in FIG. 4, the temperature sensor 160 can be provided on an outer surface of the case 152. On an inner surface of the case 152, one or more coils 154 can be positioned. As the coils 154 are operated (e.g., energized with electrical current), the coils 154 can generate heat. As the temperature of the coils 154 changes, the resistance in the coils can also change. This change can cause the operation of the motor 150 to be inaccurate or unpredictable. However, the resistance of the coils 154 and changes therein can be calculated based on the induced temperature. With such information, the operational parameters of the motor 150 can be altered so that the motor 150 continues to operate at an optimal efficiency. Accordingly, sensing the temperature of the motor 150 can allow the controller to operate the motor 150 with greater performance.

The flex circuit 170 can include a memory for storing data. For example, the memory can include EEPROM or another non-volatile memory or storage, as described further herein. The memory can be included in a layer of the flex circuit 170. The memory can be positioned between the temperature sensor 160 and the connector 178 of the flex circuit 170. The memory can include calibration data of the temperature sensor 160. For example, the calibration data can allow the flex circuit 170 to convert sensor data (e.g., signals) from the temperature sensor 160 into temperature data (e.g., in units of temperature) by applying the calibration data of the memory. Accordingly, the connector 178 can output temperature data for ready usage by a controller without requiring the controller to convert the data on its own.

As further shown in FIG. 4, the temperature sensor 160 can be coupled to the case 152 of the motor by one or more thermally conductive materials. For example, a thermal adhesive 168 (e.g., epoxy) can be provided to affix the flex circuit 170 and/or the temperature sensor 160 to the outer surface of the case 152. The thermal adhesive 168 can provide a broad surface for contact with and thermal conduction from the case 152. The temperature sensor 160 can further be coupled to the case 152 via the flex circuit 170, as described further herein. On the side of the temperature sensor 160 that is facing away from the case 152, an encapsulate covering 162 can be provided. The encapsulate covering 162 can shield the temperature sensor 160 from an external environment, such that temperature conditions in the external environment have minimal impact on the temperature sensor 160.

While the temperature sensor 160 as shown on an external surface of the case 152, it will be understood that the case 152 can provide a cavity within which the temperature sensor 160 can be positioned. Within the cavity, the temperature sensor 160 can be thermally coupled to the case 152, such as with a thermal adhesive 168. In such an arrangement, the flex circuit 170 can optionally be provided on a side of the temperature sensor 160 that is opposite the case 152.

Figure 5:
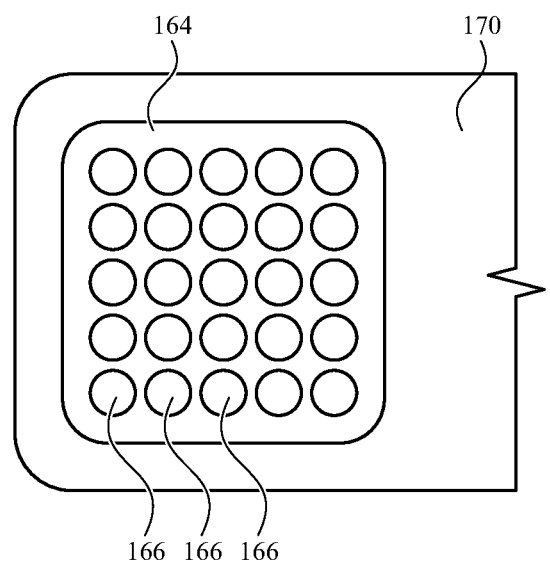
FIG. 5 illustrates a bottom view of an end of a flex circuit having a thermal coupling, according to some embodiments of the present disclosure.

Referring now to FIG. 5, a flex circuit can provide efficient thermal conduction there through to thermally connect the temperature sensor to the case of the motor. For example, the flex circuit 170 can provide an exposed conductive portion 164 on a side thereof to face the case of the motor and provide a broader interface for thermal contact. The flex circuit 170 can further provide one or more vias 166 that connect the exposed conductive portion 164 on the first side to another layer of the flex circuit 170. The vias can thereby thermally couple the temperature sensor to the case of the motor with efficient thermal conduction there between.

Figure 6:
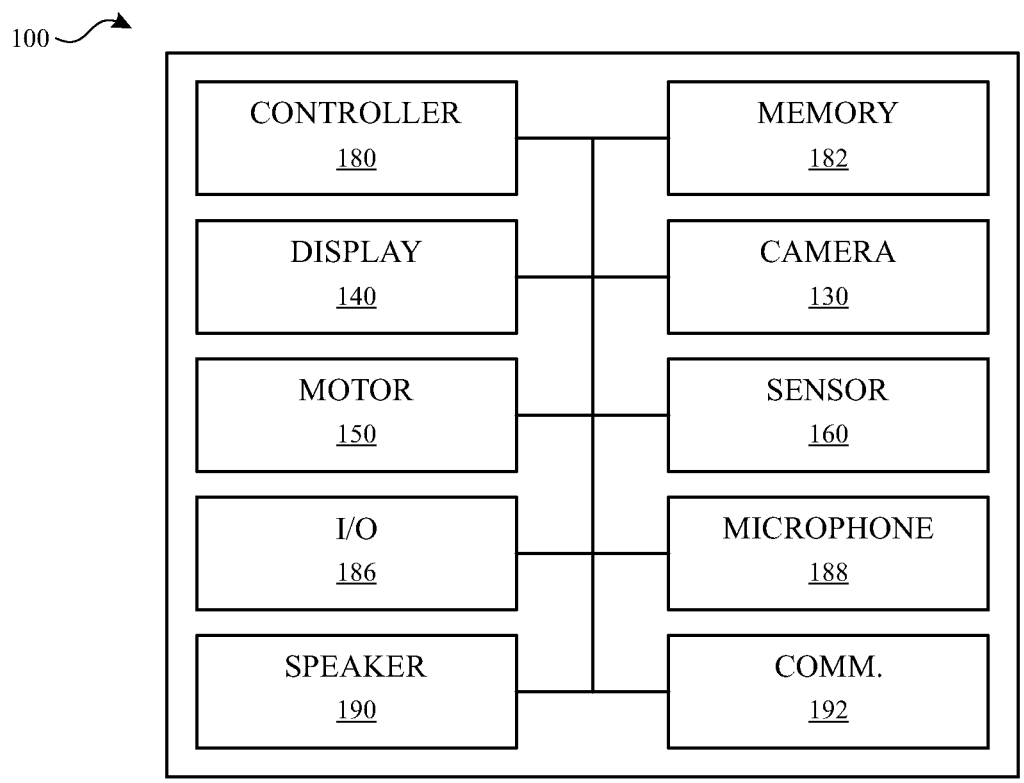
FIG. 6 illustrates a block diagram of a head-mountable device, in accordance with some embodiments of the present disclosure.

Referring now to FIG. 6, components of the head-mountable device can be operably connected to provide the performance described herein. FIG. 6 shows a simplified block diagram of an illustrative head-mountable device 100 in accordance with one embodiment of the invention. It will be appreciated that components described herein can be provided on either or both of a frame and/or a securement element of the head-mountable device 100. It will be understood that additional components, different components, or fewer components than those illustrated may be utilized within the scope of the subject disclosure.

As shown in FIG. 6, the head-mountable device 100 can include a controller 180 (e.g., control circuitry) with one or more processing units that include or are configured to access a memory 182 having instructions stored thereon. The instructions or computer programs may be configured to perform one or more of the operations or functions described with respect to the head-mountable device 100. The controller 180 can be implemented as any electronic device capable of processing, receiving, or transmitting data or instructions. For example, the controller 180 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. The memory 182 can include the memory of the flex circuit 170 described herein. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display module 140 for displaying visual information for a user. The display module 140 can provide visual (e.g., image or video) output. The display module 140 can be or include an opaque, transparent, and/or translucent display. The display module 140 may have a transparent or translucent medium through which light representative of images is directed to a user's eyes. The display module 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image based content being displayed by the display module 140 for close up viewing. The optical subassembly can include one or more lenses, mirrors, or other optical devices.

The head-mountable device 100 can include the motor 150 for moving one or more components of the head-mountable device 100, as described herein.

The head-mountable device 100 can include the temperature sensor 160 for sensing a temperature of the motor 150 and/or another component, as described herein.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the controller 180 for detection of sound levels and communication of detections for further processing, as described further herein.

The head-mountable device 100 can include the speakers 190 as described herein. The speakers 190 can be operably connected to the controller 180 for control of speaker output, including sound levels, as described further herein.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery, which can charge and/or power components of the head-mountable device 100. The battery can also charge and/or power components connected to the head-mountable device 100.

While various embodiments and aspects of the present disclosure are illustrated with respect to a head-mountable device, it will be appreciated that the subject technology can encompass and be applied to other devices. For example, a motor assembly and/or temperature sensor arrangement in accordance with embodiments disclosed herein can be included with an electronic device that generates heat during operation. Such an electronic device can be or include a desktop computing device, a laptop-computing device, a display, a television, a portable device, a phone, a tablet computing device, a mobile computing device, a wearable device, a watch, and/or a digital media player.

Accordingly, embodiments of the present disclosure provide a head-mountable device that effectively manages heat with a motor assembly that efficiently and accurately senses a temperature of a motor. The motor can be operated, for example, to move display modules relative to a frame and/or each other. Within the motor case, coils can drive a rotor. A temperature sensor can be provided on an outer surface (e.g., case) of the motor. A flex circuit can be operably connect both the motor and the temperature sensor to a controller of the head-mountable device. The flex circuit can have a first side coupled to the outer surface of the case, a second side supporting the temperature sensor, and thermally conductive vias extending from the first side to the second side to conduct heat from the case to the sensor. The flex circuit can further include a memory comprising calibration data of the temperature sensor and a connector for outputting temperature data based on the temperature sensor and the calibration data of the memory.

Various examples of aspects of the disclosure are described below as clauses for convenience. These are provided as examples, and do not limit the subject technology.

Clause A: a head-mountable device comprising: a frame; a display module; a motor configured to move the display module relative to the frame; a temperature sensor on an outer surface of the motor; and a conductive circuit operably connecting the motor and the temperature sensor to a controller of the head-mountable device.

Clause B: a motor assembly comprising: a case; coils at an inner surface of the case; and a rotor rotatable within the case based on operation of the coils; a temperature sensor on an outer surface of the case, opposite one of the coils; and a flex circuit comprising: a first side being coupled to the outer surface of the case; a second side supporting the temperature sensor; and thermally conductive vias extending from the first side to the second side to conduct heat from the case to the temperature sensor.

Clause C: a motor assembly comprising: a case containing coils and a rotor; a temperature sensor on an outer surface of the case; and a flex circuit comprising: a first end operably connected to the temperature sensor; a memory comprising calibration data of the temperature sensor; and a second end configured to output temperature data based on the temperature sensor and the calibration data of the memory.

One or more of the above clauses can include one or more of the features described below. It is noted that any of the following clauses may be combined in any combination with each other, and placed into a respective independent clause, e.g., clause A, B, or C.

Clause 1: the display module is a first display module; and the head-mountable device further comprises a second display module, wherein the motor is configured to move the second display module relative to the frame.

Clause 2: the motor is configured to control a distance between the first display module and the second display module.

Clause 3: a camera movable with the display module.

Clause 4: conductive circuit is positioned between the temperature sensor and the motor.

Clause 5: the conductive circuit further comprises a memory comprising calibration data of the temperature sensor.

Clause 6: the motor comprises: a case; coils at an inner surface of the case; and a rotor rotatable within the case based on operation of the coils.

Clause 7: a first end of the conductive circuit is positioned at the case; a second end of the conductive circuit comprises a connector for providing an operable connection to the controller; and the motor further comprises terminals operably connected to the coils, the terminals being connected to the conductive circuit between the first end of the conductive circuit and the second end of the conductive circuit.

Clause 8: the flex circuit operably connects the coils and the temperature sensor to a controller.

Clause 9: an encapsulate covering a side of the temperature sensor that is opposite the flex circuit.

Clause 10: a first end of the flex circuit is positioned at the case; a second end of the flex circuit comprises a connector for providing an operable connection to a controller; and the motor assembly further comprises terminals operably connected to the coils, the terminals being connected to the flex circuit between the first end of the flex circuit and the second end of the flex circuit.

Clause 11: a thermal adhesive coupling the first side of the flex circuit to the case.

Clause 12: the flex circuit further comprises a memory comprising calibration data of the temperature sensor.

Clause 13: the memory comprises electrically erasable programmable read-only memory (EEPROM).

Clause 14: the coils are at an inner surface of the case; the rotor is rotatable within the case based on operation of the coils; and the flex circuit operably connects the coils and the temperature sensor to a controller.

Clause 15: the flex circuit thermally couples the temperature sensor to the case.

Clause 16: a thermal adhesive coupling the flex circuit to the case.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame;
   a display module;
   a motor configured to move the display module relative to the frame, the motor comprising:
   coils; and
   terminals operably connected to the coils;
   a temperature sensor on an outer surface of the motor; and a conductive circuit operably connecting the motor and the temperature sensor to a controller of the head-mountable device, the conductive circuit comprising:
   a first end positioned at the motor; and
   a second end comprises a connector for providing an operable connection to the controller, the terminals being connected to the conductive circuit between the first end of the conductive circuit and the second end of the conductive circuit.

2. The head-mountable device of claim 1, wherein:
the display module is a first display module; and
the head-mountable device further comprises a second display module, wherein the motor is configured to move the second display module relative to the frame.

3. The head-mountable device of claim 2, wherein the motor is configured to control a distance between the first display module and the second display module.

4. The head-mountable device of claim 1, further comprising a camera movable with the display module.

5. The head-mountable device of claim 1, wherein the conductive circuit is positioned between the temperature sensor and the motor.

6. The head-mountable device of claim 1, wherein the conductive circuit further comprises a memory comprising calibration data of the temperature sensor.

7. The head-mountable device of claim 1, wherein the motor comprises:
   a case, wherein the coils are positioned at an inner surface of the case; and
   a rotor rotatable within the case based on operation of the coils.

8. A motor assembly comprising:
a case;
coils at an inner surface of the case;
terminals operably connected to the coils;
a rotor rotatable within the case based on operation of the coils;
a temperature sensor on an outer surface of the case, opposite one of the coils; and
a flex circuit comprising:
   a first side being coupled to the outer surface of the case;
   a second side supporting the temperature sensor;
   a first end positioned at the case;
   a second end comprising a connector for providing an operable connection to a controller, wherein the terminals are connected to the flex circuit between the first end of the flex circuit and the second end of the flex circuit; and
   thermally conductive vias extending from the first side to the second side to conduct heat from the case to the temperature sensor.

9. The motor assembly of claim 8, wherein the flex circuit operably connects the coils and the temperature sensor to the controller.

10. The motor assembly of claim 8, further comprising an encapsulate covering shielding a side of the temperature sensor that is opposite the flex circuit.

11. The motor assembly of claim 8, further comprising a thermal adhesive coupling the first side of the flex circuit to the case.

12. The motor assembly of claim 8, wherein the flex circuit further comprises a memory comprising calibration data of the temperature sensor.

13. A motor assembly comprising:
a case containing coils and a rotor;
terminals operably connected to the coils;
a temperature sensor on an outer surface of the case; and
a flex circuit comprising:
   a first end operably connected to the temperature sensor and positioned at the case;
   a memory comprising calibration data of the temperature sensor; and
   a second end comprising a connector for providing an operable connection to a controller and configured to output temperature data based on the temperature sensor and the calibration data of the memory, wherein the terminals are connected to the flex circuit between the first end of the flex circuit and the second end of the flex circuit.

14. The motor assembly of claim 13, wherein the memory comprises electrically erasable programmable read-only memory (EEPROM).

15. The motor assembly of claim 13, wherein:
the coils are at an inner surface of the case;
the rotor is rotatable within the case based on operation of the coils; and
the flex circuit operably connects the coils and the temperature sensor to the controller.

16. The motor assembly of claim 13, wherein the flex circuit thermally couples the temperature sensor to the case.

17. The motor assembly of claim 13, further comprising a thermal adhesive coupling the flex circuit to the case.

\* \* \* \* \*